(12) United States Patent
Jang et al.

(10) Patent No.: US 11,327,695 B2
(45) Date of Patent: May 10, 2022

(54) SECURITY PRINTING USING GROUP INFORMATION

(71) Applicant: Hewlett-Packard Development Company, L.P., Spring, TX (US)

(72) Inventors: Bosun Jang, Seongnam-si (KR); Sanghyun Park, Seongnam-si (KR); Haneol Yoon, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/272,424

(22) PCT Filed: Oct. 7, 2019

(86) PCT No.: PCT/US2019/054927
§ 371 (c)(1),
(2) Date: Mar. 1, 2021

(87) PCT Pub. No.: WO2020/251611
PCT Pub. Date: Dec. 17, 2020

(65) Prior Publication Data
US 2021/0318842 A1    Oct. 14, 2021

(30) Foreign Application Priority Data
Jun. 14, 2019    (KR) .................. 10-2019-0070588

(51) Int. Cl.
*G06F 3/12* (2006.01)
(52) U.S. Cl.
CPC .......... *G06F 3/1238* (2013.01); *G06F 3/1222* (2013.01); *G06F 3/1292* (2013.01)

(58) Field of Classification Search
None
See application file for complete search history.

(56) References Cited

U.S. PATENT DOCUMENTS

| | | |
|---|---|---|
| 2002/0016921 A1 | 2/2002 | Olsen et al. |
| 2005/0172151 A1 | 8/2005 | Kodimer et al. |
| 2006/0203282 A1 | 9/2006 | Iwai |
| 2007/0024892 A1 | 2/2007 | Cho |

(Continued)

FOREIGN PATENT DOCUMENTS

| | | | |
|---|---|---|---|
| JP | 10-143338 A | 5/1998 | |
| JP | 2006085641 A | * 3/2006 | ........... H04L 63/083 |

(Continued)

OTHER PUBLICATIONS

English translation of Japanese Application 2004-272465 corresponding to Japanese Publication 2006-085641. (Year: 2004).*

*Primary Examiner* — Thomas D Lee
(74) *Attorney, Agent, or Firm* — Jefferson IP Law, LLP (57) ABSTRACT

An example image forming apparatus includes a memory, a print engine to perform a printing job, and a processor to store received user information in the memory when the user information of a group from among a plurality of groups is received from a server having the plurality of groups and user information of each of the plurality of groups, determine whether a user corresponding to a user terminal is a user belonging to the group when print data and user information are received from the user terminal, and control the print engine to print the print data based on the determination result.

18 Claims, 9 Drawing Sheets

(56) References Cited

U.S. PATENT DOCUMENTS

| | | | |
|---|---|---|---|
| 2008/0104594 A1 | 5/2008 | Funane | |
| 2010/0095295 A1 | 4/2010 | Harada | |
| 2011/0261387 A1* | 10/2011 | Sato | G06F 3/1222 |
| | | | 358/1.14 |
| 2013/0155444 A1* | 6/2013 | Bae | H04L 67/306 |
| | | | 358/1.14 |
| 2013/0188221 A1 | 7/2013 | Ohno | |
| 2016/0283169 A1* | 9/2016 | Okada | G06F 3/1285 |

FOREIGN PATENT DOCUMENTS

| | | |
|---|---|---|
| JP | 2008-257339 A | 10/2008 |
| JP | 2017-182641 A | 10/2017 |

* cited by examiner

SECURITY PRINTING USING GROUP INFORMATION

BACKGROUND

Description of the Related Art

An image forming apparatus refers to an apparatus for printing print data generated by a terminal device such as a computer onto a recording sheet. Examples of an image forming apparatus may include a copier, a printer, a scanner, a facsimile, or a multi-function peripheral (MFP) that complexly implements the functions of the copier, the printer, the scanner, and the facsimile through a single device.

As security becomes more important, corporations, government offices, and other institutions apply various security policies when printing documents using an image forming apparatus.

DETAILED DESCRIPTION

Hereinafter, various examples will be described with reference to the accompanying drawings. The examples described below may be modified and implemented in various different forms. Like reference numerals in the drawings denote like elements, and thus a repetitive description may be omitted.

In the following description, an element that is described as being "connected" with another element includes a case in which the elements are directly connected as well as a case in which the elements are connected indirectly, for example with another element therebetween. An element that is described as "including" another element indicates that the element may not exclude another element and may further include additional elements, unless specifically stated otherwise.

In the following description, the term "image forming job" may refer to various jobs (e.g., copying, printing, scanning, or faxing) related to an image, such as forming the image and/or generating/storing/transmitting an image file, and the term "job" may refer to the image forming job in some examples, and may also refer to a series of processes necessary for performing the image forming job in other examples.

The term "server" may refer to an apparatus that provides information or a service to a client over a network. Such a service may be provided from one physical server or may be provided from a virtual server formed by dividing one physical server.

The term "image forming apparatus" may refer to an apparatus for printing print data generated by a terminal device such as a computer onto a recording sheet. Examples of an image forming apparatus may include a copier, a printer, a scanner, a facsimile, or a multi-function peripheral (MFP) that complexly implements the functions of the copier, the printer, the scanner, and the facsimile through a single device.

The term "print data" may refer to data converted into a printable format usable by a printer. When the printer supports a direct printing function, the file itself may be the print data.

The term "user" may refer to a person who performs an operation related to the image forming job by using the image forming apparatus or by using a device connected with the image forming apparatus in a wired or wireless manner.

Figure 1:
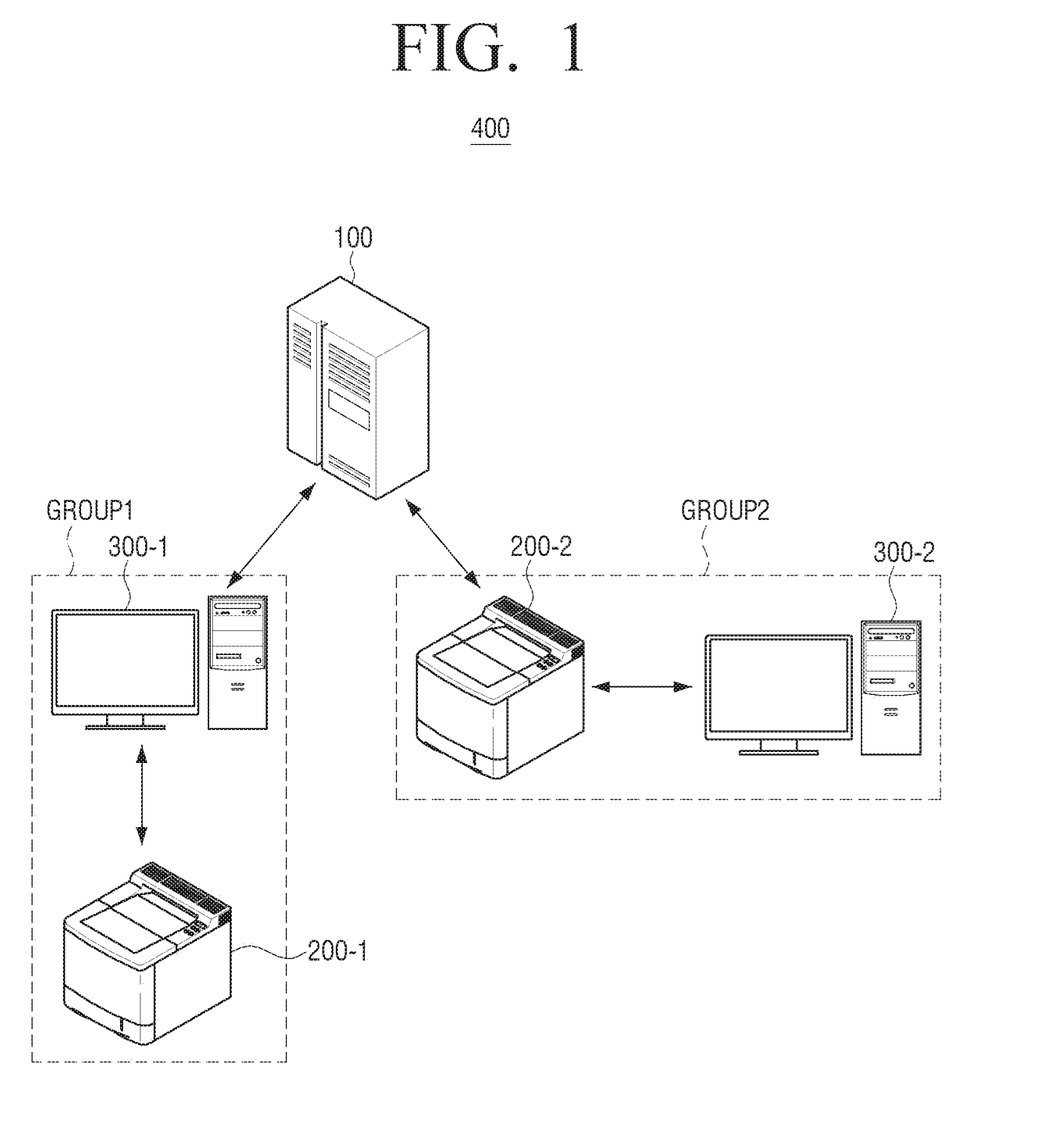
FIG. 1 is a block diagram illustrating an image forming system according to an example.

FIG. 1 is a block diagram illustrating an image forming system according to an example.

Referring to FIG. 1, an image forming system 400 may include a server 100, a plurality of image forming apparatuses 200-1 and 200-2, and a plurality of user terminals 300-1 and 300-2.

Hereinafter, for convenience of explanation, it is assumed that a first image forming apparatus 200-1 and a first user terminal 300-1 are disposed in a first group, and a second image forming apparatus 200-2 and a second user terminal 300-2 are disposed in a second group.

The server 100 may store information on a plurality of users who may use the image forming apparatuses 200-1 and 200-2. Here, the user information may include unique information (e.g., name, employee number, resident registration number, telephone number, etc.) for specifying a user, and information on a group (or affiliation) to which each user belongs. The server 100 having such user information may be referred to as a lightweight directory access protocol (LDAP) server.

As an example, the server 100 may store information on the image forming apparatuses 200-1 and 200-2 belonging to each group as the user information. For example, the server 100 may store information including a name (e.g., 'sales team printer'), a group name (e.g., 'sales team'), and an IP address (e.g., 192.168.0.22) for the first image forming apparatus 200-1 as user information.

The server 100 may delete/update/add the stored user information according to a request of a user or a manager. When the user information is changed (e.g., deleted/updated/added), the server 100 may transmit the changed user information to an image forming apparatus corresponding to a group in which the change occurs. An example configuration and operation of such a server 100 will be described later with reference to FIG. 2.

The user terminal 300 (i.e., user terminal 300-1 or 300-2) may output print data using the corresponding image forming apparatus 200 (i.e., image forming apparatus 200-1 or 200-2). For example, the user terminal 300 may transfer print data to the image forming apparatus 200 to perform a printing job. As an example, the user terminal 300 may transmit the print data including the user information to the image forming apparatus 200. As an example, the user information may be transmitted to the image forming apparatus 200 as separate information distinguished from the print data or may be transmitted to the image forming apparatus 200 in a form included in the print data.

When an inquiry from the image forming apparatus 200 is received, the user terminal 300 may display the received inquiry and request confirmation of whether to proceed with printing of the print data from the user. If the user confirms to proceed with printing of the print data, the user terminal 300 may request an output of the print data to the image forming apparatus 200 to which the print data is previously transmitted. On the other hand, if the user selects a wrong image forming apparatus, the user terminal 300 may request delivery of the print data which is previously sent to another image forming apparatus by transmitting address information of the other image forming apparatus.

For example, when the first user terminal 300-1 belonging to the first group transmits the print data to the image forming apparatus 200-1 in the first group, the first image forming apparatus 200-1 may immediately print the received data. On the contrary, when the first user terminal 300-1 belonging to the first group transmits the print data to the second image forming apparatus 200-2 in the second group, the second image forming apparatus 200-2 may request confirmation as to whether to proceed with printing the print data to the first user terminal 300-1, and selectively print the print data according to the confirmation result.

The image forming apparatus 200 may store user information corresponding to a group to which the image forming apparatus 200 belongs, and determine whether a user corresponding to the user terminal 300 that transmits the print data is a user of the group to which the image forming apparatus 200 belongs based on the stored user information. For example, the first image forming apparatus 200-1, which is a member of the first group, may store user information on users belonging to the first group.

As a result of the determination, if the user corresponding to the user terminal 300 that transmits the print data is the user of the group to which the image forming apparatus 200 belongs, the image forming apparatus 200 may immediately proceed with the printing job. On the contrary, if the user corresponding to the user terminal 300 that transmits the print data is not the user of the group to which the image forming apparatus 200 belongs, the image forming apparatus 200 may store the received print data, and may inquire the user terminal 300 or the manager who transmitted the print data whether to proceed with the printing. An example configuration and operation of such an image forming apparatus will be described later with reference to FIGS. 3 and 4.

The image forming system 400 may determine whether the user who transmits the print data is a member of the group capable of using the corresponding image forming apparatus based on the pre-stored user information to perform the printing job, thereby making it possible to prevent the printing from proceeding to an apparatus which the user does not intend.

For example, when the first image forming apparatus 200-1 and the second image forming apparatus 200-2 are disposed in different spaces (e.g., different buildings, different floors, etc.), but use the same network, the user terminals 300-1 and 300-2 display both the image forming apparatuses 200-1 and 200-2 as workable apparatuses at the time of the printing job. Even in such an environment, when the disclosure is applied, the printing is prevented from immediately proceeding if the user requests the printing job to the image forming apparatus in another space.

The image forming system 400 according to an example may output a document without a procedure such as ID registration for security printing, thereby improving user convenience.

Although an example has been described in which the image forming apparatus 200 stores the user information and determines whether the user who requests the print data is a user in the group using the stored information, in another example, the image forming apparatus 200 may inquire of the server 100 whether it is possible to perform the printing job when the print data is requested and proceed with the printing job according to the inquiry result.

In describing FIG. 1, although the respective components are illustrated and described as being directly connected, the respective apparatuses may be also be implemented in a form of being directly connected as well as indirectly connected through a router and another device (for example, a server). In the illustrated example, although the respective apparatuses are illustrated as being connected by wire, the respective apparatuses may also be implemented in a form that is wirelessly connected.

In describing FIG. 1, although the server 100 has been described as being composed of one apparatus, the server 100 may be implemented as a plurality of servers. For example, a server managing the user information and a server providing the user information to each image forming apparatus may be divided.

Figure 2:
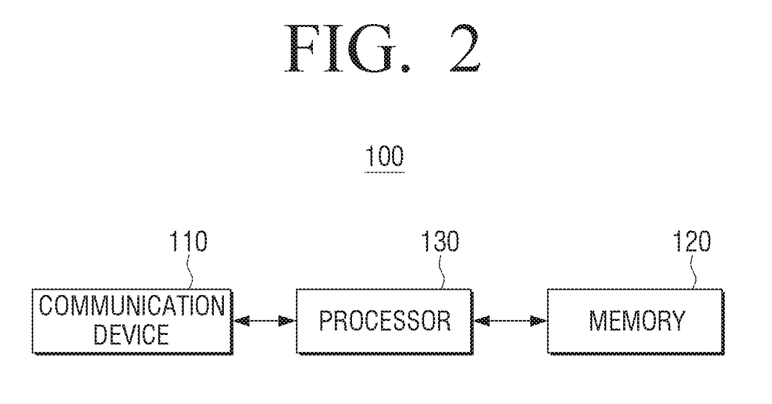
FIG. 2 is a block diagram illustrating a configuration of a server according to an example.

FIG. 2 is a block diagram illustrating a configuration of a server according to an example.

Referring to FIG. 2, the server 100 may include a communication device 110, a memory 120, and a processor 130. As such a server 100, not only a general server apparatus but also an LDAP server may be used.

Here, LDAP refers to a software protocol that may be used to find information (e.g., phone numbers, addresses, organizations, files, hardware locations such as printers, accounts, etc.) on a network. The LDAP server is a server that stores and manages the information as described above in a directory manner in order to more easily provide the information as described above to other apparatuses.

The communication device 110 is formed to connect the server 100 with an external device and may be connected through a universal serial bus (USB) port and a wireless module, as well as connected through a local area network (LAN) and an internet network.

The communication device 110 may receive user information from the user terminal 300. Here, the user information may include unique information (e.g., user name, ID, employee number, resident registration number, phone number, email address, etc.) for identifying the user terminal 300, and group information to which the user belongs, and may also include additional information (e.g., country information, rank, etc.) for managing the user.

The communication device 110 may provide the user information to the image forming apparatus 200. For example, the communication device 110 may provide user information corresponding to a user belonging to a specific image forming apparatus 200 to the corresponding image forming apparatus 200. As an example, the communication device 110 may transmit only some information (e.g., identification information) necessary for determining a group of the user to the image forming apparatus 200.

The communication device 110 may be notified by the image forming apparatus 200 that the print data is received from a user who does not belong to the group. In an example, the communication device 110 may provide the notification to the manager.

Figure 5:
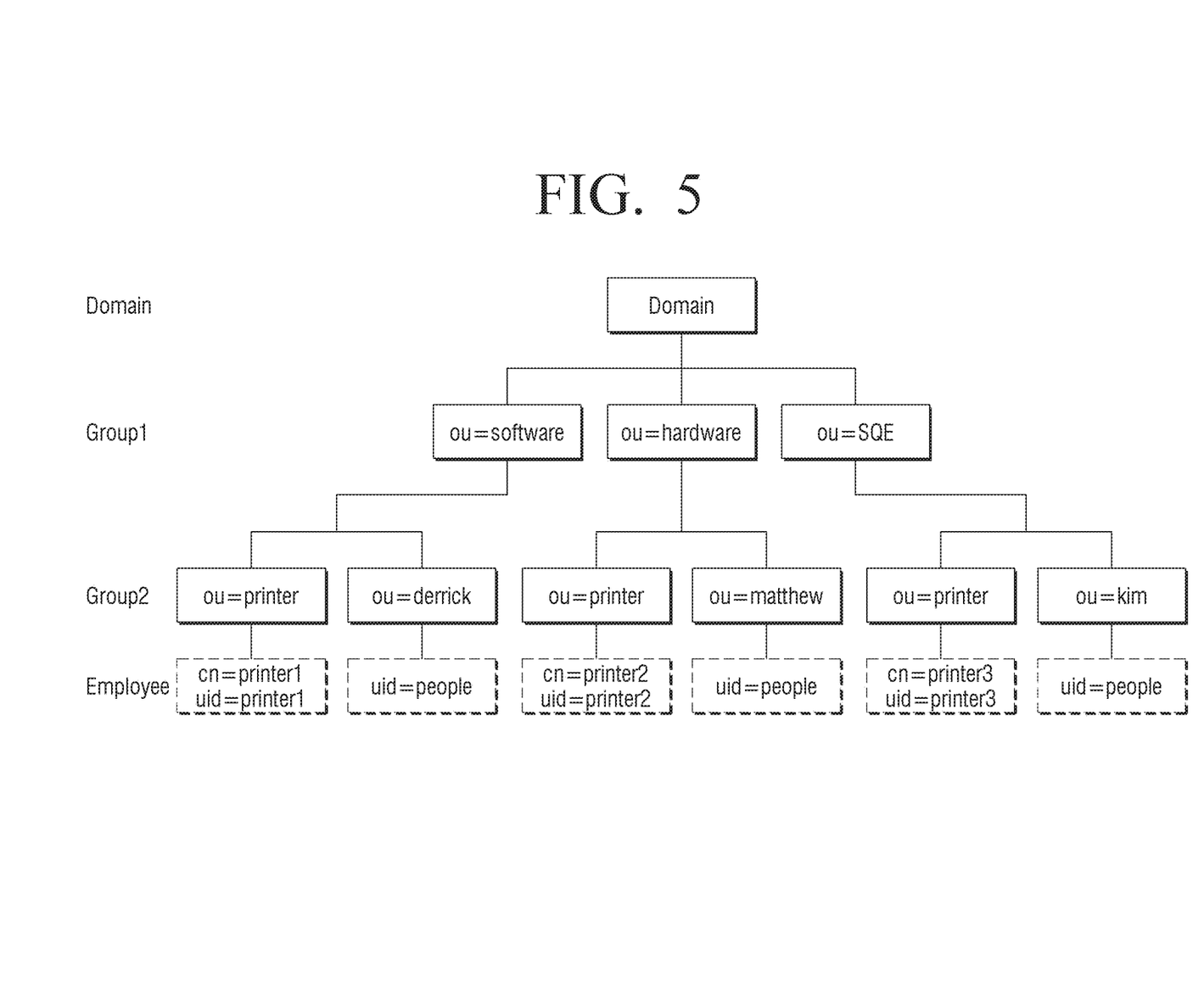
FIG. 5 is a diagram illustrating group information according to an example.

The memory 120 stores the user information. As an example, the memory 120 may store a plurality of user information partitioned for each group. For example, as illustrated in FIG. 5, the memory 120 may store the user information in a tree form (or directory form).

The memory 120 may be implemented as a removable disk including a storage medium in the server and an external storage medium, for example, a USB memory, a file server through a network, or the like.

The processor 130 may perform a control for each of the components in the server 100. For example, when the processor 130 receives the user information from the user terminal 300, the processor 130 may store the received information in the memory 120. That is, the processor 130 may update the user information of the group by including received new user information in a group corresponding to new user information.

The processor 130 may control the communication device 110 to transmit the updated user information to the image forming apparatus 200 that proceeds with the printing of a group corresponding to an added user. The processor 130 may control the communication device 110 to transmit the user information to the image forming apparatus 200 not only when the update is performed, but also when the user information is periodically transmitted to the image forming apparatus 200 or when there is a request (e.g., a synchronization request for the user information) of the image forming apparatus 200.

When the processor 130 receives the print request from a user who does not belong to the group of the image forming apparatus 200, the processor 130 may control the communication device 110 to notify the manager of such a fact.

The processor 130 may confirm whether a user who requests a printing job to the image forming apparatus 200 is a user of a group to which the image forming apparatus 200 belongs. For example, new user information may be registered only in the server 100 and not yet registered in the image forming apparatus 200. In such a case, the processor 130 may request the corresponding image forming apparatus 200 to proceed with the printing job of the user and may provide the user information of the group including the corresponding user to the corresponding image forming apparatus 200.

As described above, the server 100 according to an example provides the user information of the group capable of using the image forming apparatus 200 to the image forming apparatus 200, thereby making it possible to prevent the user from using the image forming apparatus of another group to which the user does not belong.

Figure 3:
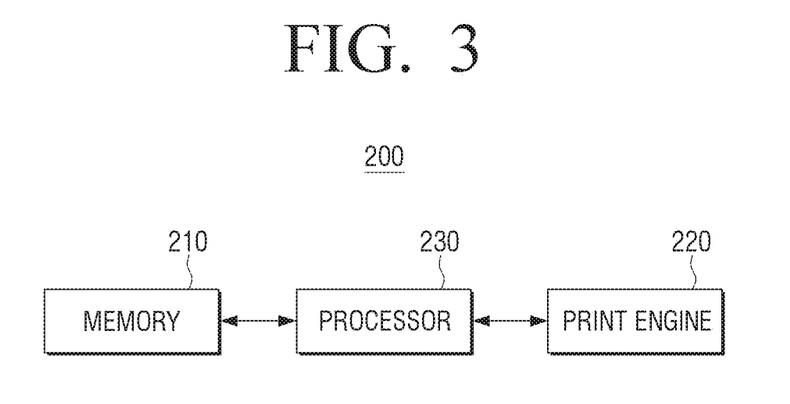
FIG. 3 is a block diagram illustrating a configuration of an image forming apparatus according to an example.

FIG. 3 is a block diagram illustrating a configuration of an image forming apparatus according to an example.

Referring to FIG. 3, the image forming apparatus 200 may include a memory 210, a print engine 220, and a processor 230.

The memory 210 may store apparatus information and group information of the image forming apparatus. Here, the apparatus information may be an apparatus name, an address (e.g., an IP address, a MAC address, etc.) of the image forming apparatus, and the group information may be a name of a group to which the image forming apparatus 200 belongs. When the image forming apparatus 200 is available to a plurality of groups of users, the memory 210 may store a plurality of group names.

The memory 210 may store user information belonging to the groups. The memory 210 may store the received print data.

The memory 210 may store programs and data for configuring various user interfaces (UIs) constituting a user interface window. The memory 210 may store various contents. Here, the contents may be printable document files (or print data), image files (e.g., scanned images), or the like.

The print engine 220 may print the print data on a print sheet. For example, the print engine 220 may print the received print data on the print sheet by any one of an inkjet method, a dot-jet method, a laser printer method, or the like.

The processor 230 controls the respective configurations in the image forming apparatus 200. Such a processor 230 may be implemented as one element such as an application specific integrated circuit (ASIC) or a Central Processing Unit (CPU), or may be implemented as a plurality of configurations.

If the processor 230 receives the print data from the user terminal 300, the processor 230 determines whether a user corresponding to the user terminal 300 that transmits the print data is a user in the group to which the image forming apparatus 200 belongs. For example, the processor 230 may determine whether the user terminal 300 is a user terminal of a user in the group to which the image forming apparatus 200 belongs by obtaining an Internet Protocol (IP) address of the user terminal 300, a device name described in the print data, or the user information, and confirming whether the obtained information belongs to pre-stored user information.

The processor 230 may control the print engine 220 to print the print data based on the determination result. For example, if the user who transmits the print data is a user in the group, the processor 230 may control the print engine 220 to print the received print data.

Hereinabove, although only a simple configuration of the image forming apparatus 200 is illustrated and described, the image forming apparatus 200 may further include a configuration other than the above-described configuration. A more detailed configuration of the image forming apparatus 200 will be described below with reference to FIG. 4.

Figure 4:
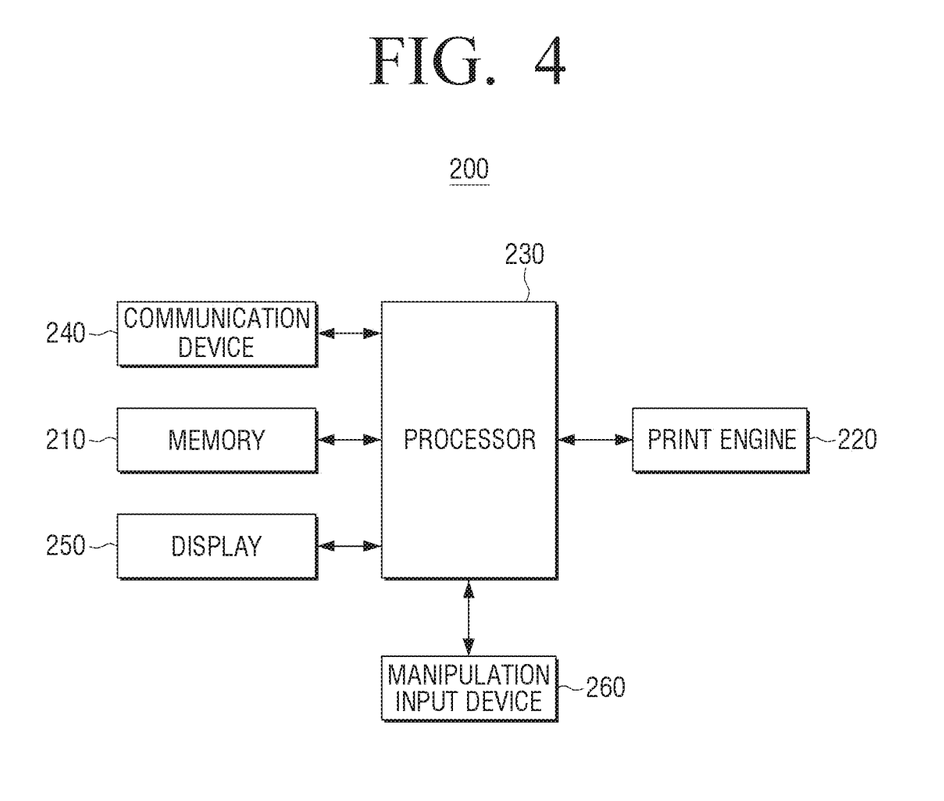
FIG. 4 is a block diagram illustrating a configuration of an image forming apparatus according to an example.

FIG. 4 is a block diagram illustrating a configuration of an image forming apparatus according to an example.

Referring to FIG. 4, the image forming apparatus 200 may include the memory 210, the print engine 220, the processor 230, a communication device 240, a display 250, and a manipulation input device 260.

The configuration of the memory 210 and the print engine 220 has been described with reference to FIG. 3, and a redundant description thereof will be thus omitted. The configuration of the processor 230 has been described in part with reference to FIG. 3, only an added function with respect to the configurations added to FIG. 4 will be described.

The communication device 240 may connect the image forming apparatus 200 with an external device and may be connected through a USB port or a wireless module, as well as connected through a LAN or an internet network. Here, the wireless module may be WiFi, WiFi Direct, Near Field Communication (NFC), Bluetooth, or the like.

The communication device 240 may transmit apparatus information to the server 100. The communication device 240 may receive user information from the server 100. For example, the communication device 240 may receive the user information in a directory corresponding to a group to which the image forming apparatus 200 belongs from the server 100 using an LDAP.

The communication device 240 may receive print data from the user terminal 300. Here, the print data may be data of a printer language such as postscript (PS), printer control language (PCL), or the like, and may be a file itself such as PDF, XPS, BMP, or JPG.

The communication device 240 may inquire the user terminal 300 whether to proceed with the printing. In response, the communication device 240 may receive a print proceeding request or a print cancel command.

The display 250 may display a variety of information provided from the image forming apparatus 200. The display 250 may be a monitor and may also be a touch screen capable of simultaneously performing a function of the manipulation input device 260 to be described later.

The display 250 may display a menu UI for selecting a function supported by the image forming apparatus. For example, the display 250 may display an input request of information required to register with the server 100 on the UI.

The manipulation input device 260 may include a plurality of function keys that allow the user to set or select various functions supported by the image forming apparatus 200. Such a manipulation input device 260 may be implemented as a button, a touch pad, a mouse, a keyboard, or the like, or may be implemented as a touch screen that may also perform the functions of the display 250 described above.

The manipulation input device 260 may receive information required to register the user. For example, the manipulation input device 260 may receive a name of the image forming apparatus 200, an e-mail address, a group name to which the image forming apparatus 200 belongs, or the like.

The processor 230 may control the communication device 240 to transmit the apparatus information of the image forming apparatus 200 to the server 100 as the user information.

The processor 230 may control the communication device 240 to periodically request the user information from the server 100. For example, the processor 230 may control the communication device 240 to receive the user information in a directory corresponding to the group to which the image forming apparatus 200 belongs. As an example, the processor 230 may use an LDAP.

When the processor 230 receives the user information from the server 100, the processor 230 may store the received user information in the memory 210.

In a previous determination operation, if the user who requests the print data is not a user in the group, the processor 230 may control the communication device 240 to inquire at least one of the user terminal 300 that transmits the print data or the manager whether to proceed with the printing. Such an inquiry may be performed through a network communication, and a short message service (SMS), an e-mail, or the like may be used. As an example, the processor 230 may temporarily store the received print data in the memory 210.

In response to the inquiry, when the print proceeding request is received from the user terminal 300 or the manager, the processor 230 may control the print engine 220 to print the received print data (or the print data stored in the memory).

If a print cancel command is received from the user terminal 300 or the manager, the processor 230 may end the requested job. The processor 230 may delete the print data stored in the memory 210.

If a proceeding confirmation or print cancel command of the print data is not received from the user terminal 300 or the manager within a predetermined time, the processor 230 may delete the print data stored in the memory 210.

As described above, the image forming apparatus 200 according to an example uses the user information in the group to which the image forming apparatus 200 belongs, and an output of printing by a user who does not belong to the group may be thus prevented. The image forming apparatus 200 may proceed with the output of printing by the user belonging to the group without an additional input by the user, and convenience of the user is thus improved.

FIG. 5 is a diagram illustrating group information according to an example.

Referring to FIG. 5, a plurality of users have groups divided into two layers. First, a first group is a group divided into software, hardware, and structured query engine (SQE), and a second group is a group under the first group. For example, the software group includes a first subgroup called printer and a second subgroup called derrick.

A plurality of users and a first printer (i.e., printer1) belong to the first subgroup (printer). Therefore, when a user belonging to the first subgroup (printer) requests printing to the first printer, the printing is performed without a separate confirmation operation. On the other hand, when a user belonging to the hardware group or the SQE group requests a printing job to the first printer, an operation of confirming to proceed with the printing job may be performed.

Each of the plurality of illustrated groups may be configured as a single directory, a software folder, a hardware folder, and an SQE folder corresponding to the first group may be included under a root folder called a domain, and each folder may include a folder corresponding to the subgroup.

Accordingly, the first printer belonging to the printer group of the software group may receive user information stored in a folder (\software\printer) corresponding to the first printer from the server 100.

In the illustrated example, although it has been described that the first printer belongs to only the first subgroup, the first printer may be implemented as belonging to both the first subgroup and the second subgroup. That is, the printing may be performed on the print request of the user belonging to the first subgroup and the second subgroup without a separate confirmation operation. For example, even in a case in which a user belonging to the second subgroup (derrick) uses the first printer, the printing may be performed without the separate confirmation operation.

In illustrating FIG. 5, although it has been illustrated that the tree structure has only the two layers, the tree structure may also have three or more layers in corporations, government offices, or other entities that operate tens or hundreds of image forming apparatuses.

Figure 6:
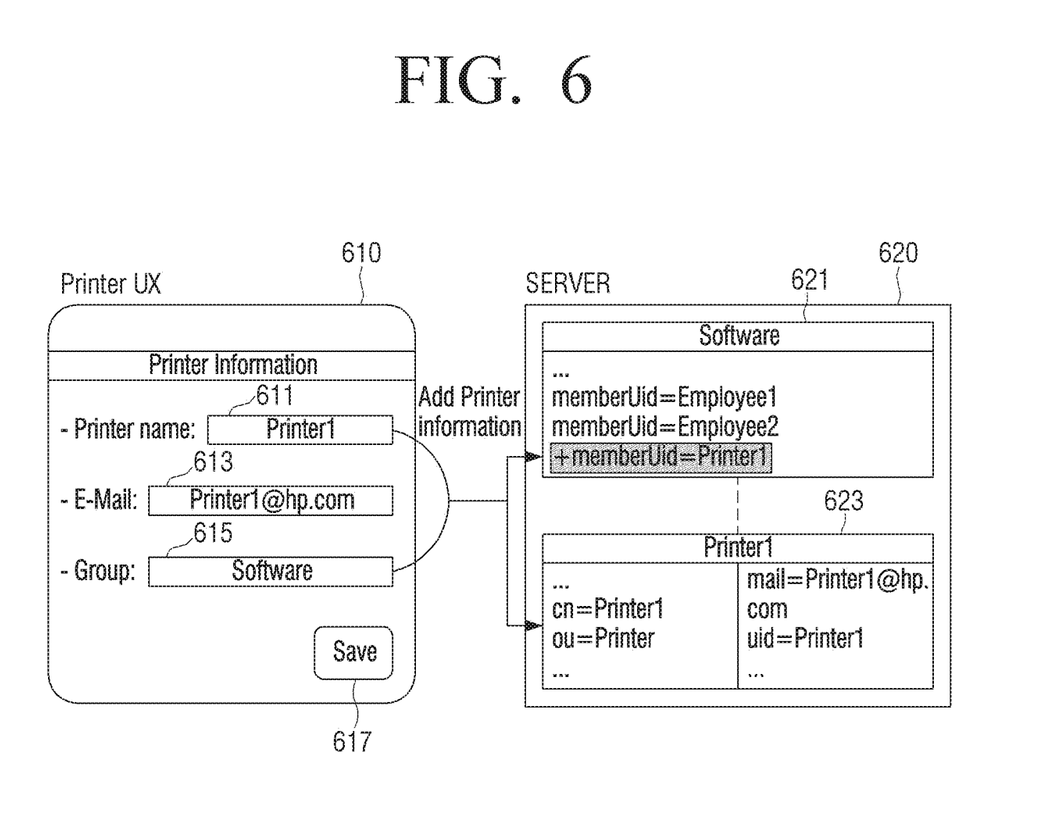
FIG. 6 is a diagram illustrating a method for registering user information according to an example.

FIG. 6 is a diagram illustrating a method for registering user information according to an example.

Referring to FIG. 6, a manager may select a save button 617 to set and store a name 611, an e-mail 613, and a group name 615 of a printer on a UI screen 610 of the image forming apparatus 200.

When the setting is completed, the image forming apparatus 200 may transmit its information to the server 100.

In response to the transmission, the server 100 may add information 621 of the corresponding image forming apparatus 200 to a group 620 belonging to the corresponding image forming apparatus 200. Accordingly, an added image forming apparatus 623 may be registered as a user in the group 620.

The server 100 may transmit user information belonging to the group (e.g., software) to which the corresponding image forming apparatus 200 belongs to the image forming apparatus 200.

In the illustrated example, although only the operation of registering the image forming apparatus 200 to the server 100 is illustrated and described, the registration of the user terminal 300 may also be performed in the same form.

In the illustrated example, although it has been described that the server 100 directly receives the information of the image forming apparatus, the name, the email address, and the group name of the image forming apparatus may be received using a web page provided by the image forming apparatus 200.

Figure 7:
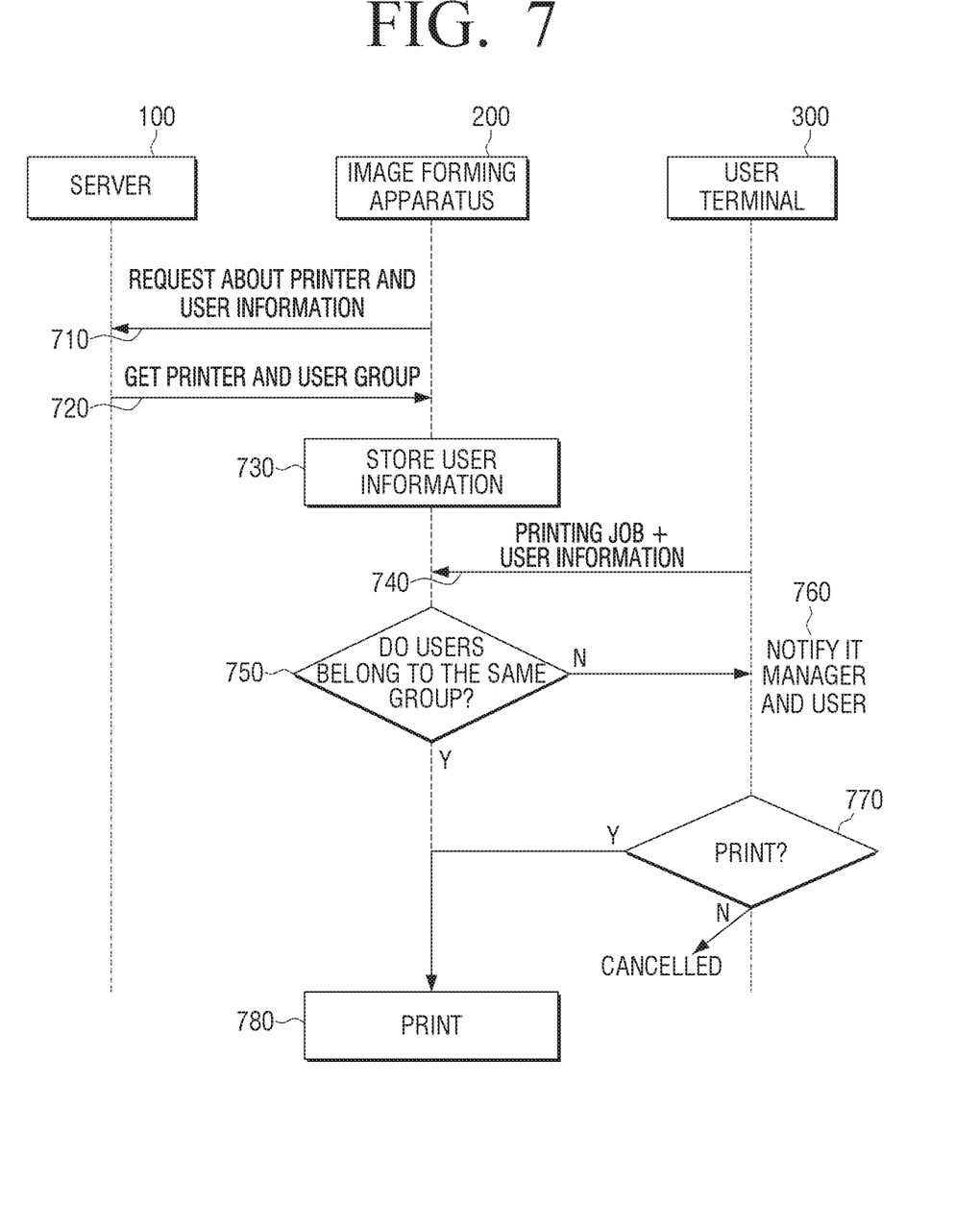
FIG. 7 is a sequence diagram illustrating a security printing method according to an example.

FIG. 7 is a sequence diagram illustrating a security printing method according to an example.

Referring to FIG. 7, the image forming apparatus 200 may request registration to the server 100 in operation 710. For example, the image forming apparatus 200 may transmit the apparatus information of the image forming apparatus 200 and the information on the group to which the image forming apparatus 200 belongs to the server 100, and may request the formation (e.g., the user information belonging to the corresponding group) on the group to which the image forming apparatus 200 belongs.

The server 100 may store the received information of the image forming apparatus 200 as the user information and transmit the user information on the group to which the image forming apparatus 200 belongs to the image forming apparatus 200 in operation 720. As an example, the server 100 may transmit only some items necessary for group determination among the stored user information to the image forming apparatus 200.

The image forming apparatus 200 receiving the user information may store the received user information in operation 730.

When a print request is received from the user terminal 300 in operation 740, it may be determined whether the print request of the user terminal 300 is a request of a user in the corresponding group based on previously stored user information in operation 750.

As a result of the determination, if the print request is a print request of a user belonging to the same group (i.e., 750—Y), the image forming apparatus 200 may immediately print the received print data in operation 780.

On the contrary, if the print request is not a print request of a user belonging to the same group (i.e., 750—N), the received print data is stored in a memory, a manager and/or user who transmits the print data is notified in operation 760, and the image forming apparatus 200 may confirm whether to proceed with the printing from the user terminal 300 or the manager in operation 770.

If a print proceeding request is received from the user terminal 300 or the manager (i.e., 770—Y), the printing may proceed using the print data stored in the memory in operation 780.

On the contrary, if a cancel command is input, the printing job may be cancelled (i.e., 770—N). The print data stored in the memory may be deleted.

Figure 8:
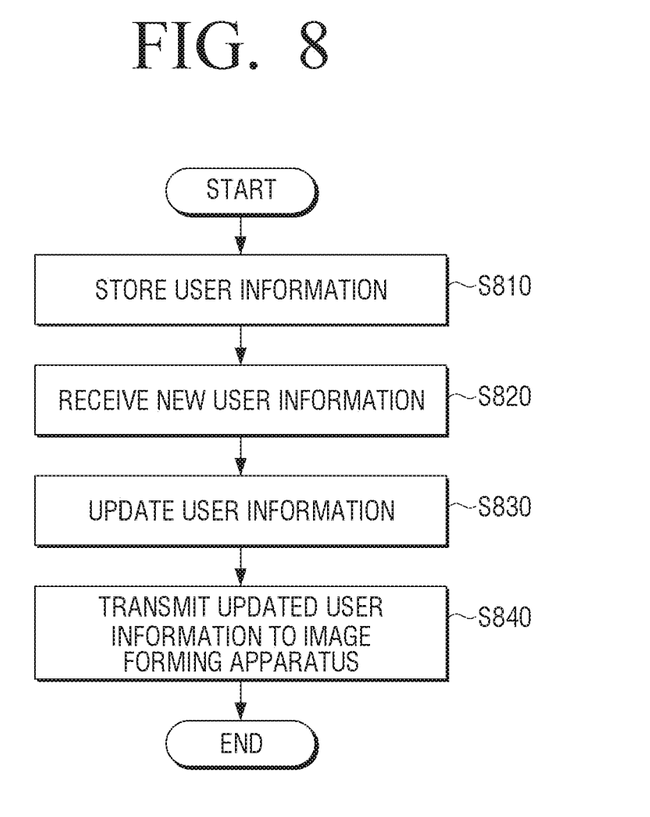
FIG. 8 is a flowchart illustrating a method for managing user information according to an example.

FIG. 8 is a flowchart illustrating a method for managing user information according to an example.

Referring to FIG. 8, the server 100 stores a plurality of user information in operation S810. For example, the server 100 may store a plurality of groups and user information belonging to each of the plurality of groups. As an example, the server 100 may store information on a plurality of image forming apparatuses as the user information described above.

When new user information is received from the user terminal 300 or the image forming apparatus 200 in operation S820, the server 100 may update the user information of the group by including the new user information in a group corresponding to the new user information in operation S830.

The user information of the corresponding group may be transmitted to the image forming apparatus belonging to the updated group in operation S840. If there are a plurality of image forming apparatuses in the corresponding group, the user information of the corresponding group may be transmitted to each of the plurality of image forming apparatuses.

As described above, a method for managing user information according to an example provides the user information of the group capable of using the image forming apparatus 200 to the image forming apparatus 200, thereby making it possible to prevent a user from proceeding with the print output using the image forming apparatus of another group.

Figure 9:
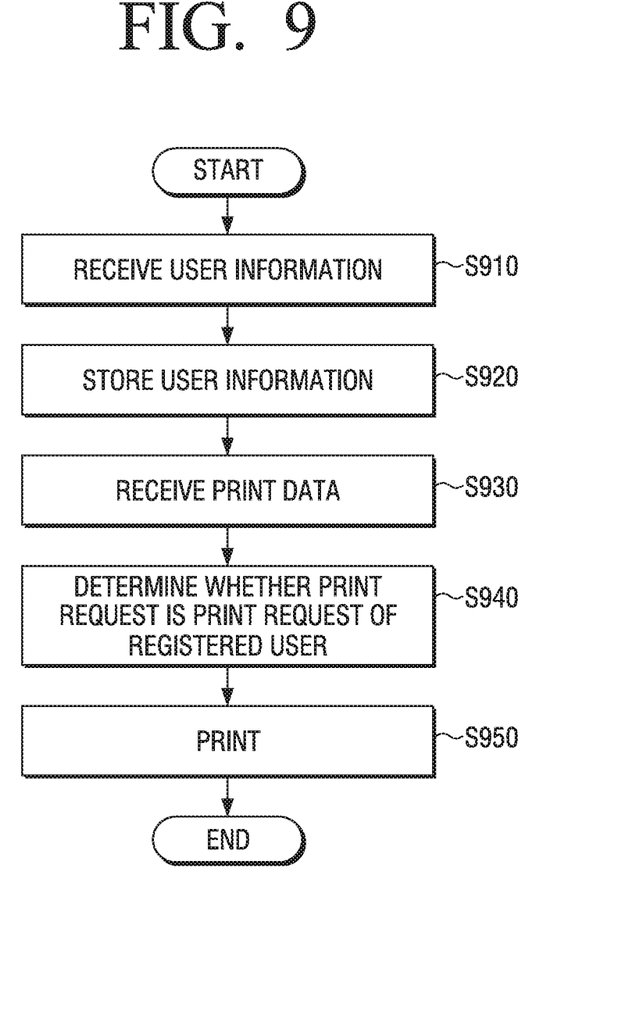
FIG. 9 is a flowchart illustrating an image forming method according to an example.

FIG. 9 is a flowchart illustrating an image forming method according to an example.

Referring to FIG. 9, the image forming apparatus 200 stores user information on a plurality of users in operation S910. For example, the image forming apparatus 200 may receive user information of a group from among a plurality of groups from a server having the plurality of groups and user information of each of the plurality of groups.

The image forming apparatus 200 stores the received user information in operation S920. The received information may be stored in the memory of the image forming apparatus. If updated information to which a new user is added is received, the user information stored in the memory may be updated.

The image forming apparatus 200 receives print data and user information from a user terminal in operation S930. As an example, the user information may be included in the print data and received or may be provided as separate information distinguished from the print data and received.

The image forming apparatus 200 determines whether a user corresponding to the user terminal belongs to the group in operation S940. For example, it may be determined whether the print request of the user who requests the printing job may immediately proceed based on whether the received user information is included in the pre-stored user information.

The print data is printed based on the determination result in operation S950. For example, the printing may immediately proceed for the print request of the user belonging to the group. On the contrary, if the user corresponding to the user terminal is not the user belonging to some groups, the user terminal is inquired as to whether to proceed with the printing of the print data, and the print data may be printed only when a print proceed request is received from the user terminal.

As described above, an example image forming method uses the user information in the group to which the user belongs, and the output of printing by a user who does not belong to the group may be thus prevented. The output of printing by the user belonging to the group proceeds without an additional job (e.g., user input), and convenience of the user is thus improved.

The example managing method of user information or the example image forming method described above may be implemented as a program and provided to the image forming apparatus or the server. As an example, the managing method of user information or the image forming method may be stored in a non-transitory computer readable medium and provided.

Here, the non-transitory computer readable medium may be a compact disc (CD), a digital video disc (DVD), a hard disk drive (HDD), a solid state drive (SSD), a Blu-ray disc, a USB memory, a memory card, a read-only memory (ROM), or the like.

Although examples of the disclosure have been illustrated and described hereinabove, the disclosure is not limited thereto, but may be variously modified and altered by those skilled in the art to which the disclosure pertains without departing from the spirit and scope of the disclosure claimed in the claims. These modifications and alterations are to fall within the scope of the disclosure.

What is claimed is:

1. An image forming apparatus comprising:
a memory;
a print engine to perform a printing job; and
a processor to:
store received user information in the memory based on the user information of a group from among a plurality of groups being received from a server having the plurality of groups and user information of each of the plurality of groups,
determine whether a user corresponding to a user terminal is a user belonging to the group based on print data and user information being received from the user terminal, and
control the print engine to print the print data based on the determination result, and
inquire the user terminal whether to proceed with the printing of the print data based on the user corresponding to the user terminal not being the user belonging to the group.

2. The image forming apparatus as claimed in claim 1, wherein the processor is to:
store the received print data in the memory, and
delete the print data stored in the memory based on a proceeding confirmation or print cancellation command of the print data not being received within a predetermined time after the print data is stored.

3. The image forming apparatus as claimed in claim 1, wherein the processor is to transmit the print data to received address information based on receiving address information of another image forming apparatus from the user terminal.

4. The image forming apparatus as claimed in claim 1,
wherein the image forming apparatus is registered as a user in at least one group of the plurality of groups, and
wherein the processor is to receive user information on the at least one group to which the image forming apparatus belongs.

5. The image forming apparatus as claimed in claim 4, wherein the processor is to receive user information in a directory corresponding to the at least one group to which the image forming apparatus belongs from the server using a lightweight directory access protocol (LDAP).

6. The image forming apparatus as claimed in claim 1, wherein the processor is to receive the user information of the group from the server and update the user information stored in the memory, based on a predetermined event occurring.

7. An image forming method comprising:
receiving user information of a group from among a plurality of groups from a server having the plurality of groups and user information of each of the plurality of groups;
storing the received user information;
receiving print data and user information from a user terminal;
determining whether a user corresponding to the user terminal is a user belonging to the group;
printing the print data based on the determination result; and
inquiring the user terminal whether to proceed with the printing of the print data based on the user corresponding to the user terminal not being the user belonging to the group.

8. The image forming method as claimed in claim 7, further comprising:
storing the received print data; and
deleting the stored print data based on a proceeding confirmation or print cancellation command of the print data not being received within a predetermined time after the print data is stored.

9. The image forming method as claimed in claim 7, further comprising:
receiving address information of another image forming apparatus from the user terminal; and
transmitting the print data to the received address information.

10. The image forming method as claimed in claim 7,
wherein the image forming apparatus is registered as a user in at least one group of the plurality of groups, and
wherein the receiving of the user information of the group comprises receiving user information on the at least one group to which the image forming apparatus belongs.

11. The image forming method as claimed in claim 10, wherein the receiving of the user information comprises receiving user information in a directory corresponding to the at least one group to which the image forming apparatus belongs from the server using a lightweight directory access protocol (LDAP).

12. The image forming method as claimed in claim 7, further comprising receiving the user information of the group from the server and updating the stored user information, based on a predetermined event occurring.

13. A non-transitory computer readable recording medium including instructions for managing user information by an image forming apparatus, the non-transitory computer readable recording medium comprising:
instructions to store user information based on the user information of a group from among a plurality of groups being received from a server having the plurality of groups and user information of each of the plurality of groups;
instructions to determine whether a user corresponding to a user terminal is a user belonging to the group based on print data and user information being received from the user terminal;
instructions to control a print engine to print the print data based on the determination result; and
instructions to inquire the user terminal whether to proceed with the printing of the print data based on the user corresponding to the user terminal not being the user belonging to the group.

14. The non-transitory computer readable recording medium of claim 13, further comprising:
instructions to store the received print data; and
instructions to delete the stored print data based on a proceeding confirmation or print cancellation command of the print data not being received within a predetermined time after the print data is stored.

15. The non-transitory computer readable recording medium of claim 13, further comprising:
instructions to receive address information of another image forming apparatus from the user terminal; and
instructions to transmit the print data to the received address information.

16. The non-transitory computer readable recording medium of claim 13,
wherein the image forming apparatus is registered as a user in at least one group of the plurality of groups, and wherein the receiving of the user information of the group comprises receiving user information on the at least one group to which the image forming apparatus belongs.

17. The non-transitory computer readable recording medium of claim 16, wherein the instructions to receive the user information comprise instructions to receive user information in a directory corresponding to the at least one group to which the image forming apparatus belongs from the server using a lightweight directory access protocol (LDAP).

18. The non-transitory computer readable recording medium of claim 13, further comprising instructions to receive the user information of the group from the server and update the stored user information, based on a predetermined event occurring.

* * * * *